No. 761,913. PATENTED JUNE 7, 1904.
J. P. RICH.
LIME SLAKING APPARATUS.
APPLICATION FILED JULY 15, 1903.
NO MODEL.
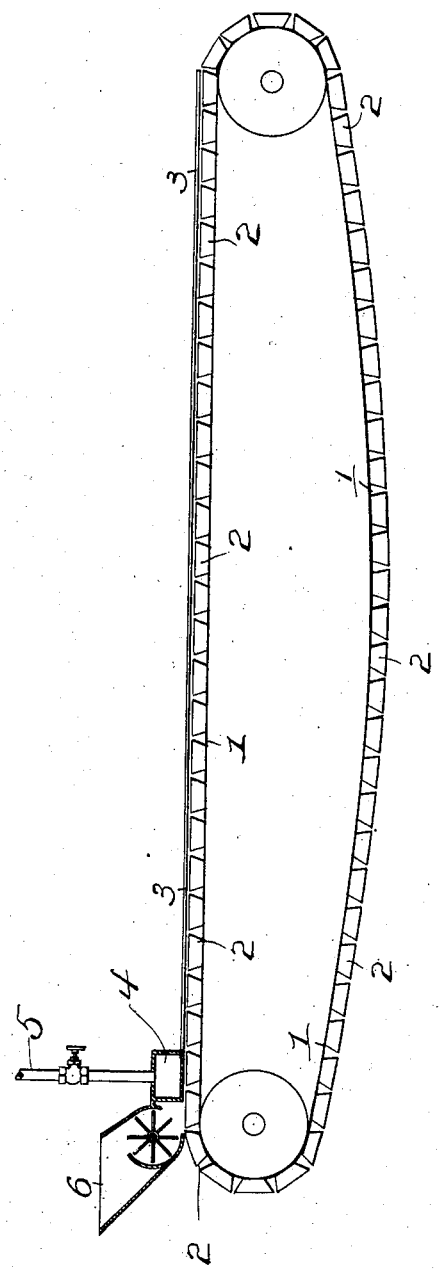
WITNESSES
INVENTOR No. 761,913. Patented June 7, 1904.

UNITED STATES PATENT OFFICE.

JOHN P. RICH, OF SWANTON JUNCTION, VERMONT.

LIME-SLAKING APPARATUS.

SPECIFICATION forming part of Letters Patent No. 761,913, dated June 7, 1904.

Application filed July 15, 1903. Serial No. 165,604. (No model.)

*To all whom it may concern:*

Be it known that I, JOHN P. RICH, of Swanton Junction, in the county of Franklin and State of Vermont, have invented certain new and useful Improvements in Lime-Slaking Apparatus; and I do hereby declare the following to be a full, clear, and exact description of the invention, such as will enable others skilled in the art to which it appertains to make and use the same.

My invention relates to an improved lime-slaking apparatus, the object of the invention being to slake the lime evenly and completely by adding to definite amounts of lime the proper amount of water for their complete slaking while the lime is contained in the compartments of a movable conveyer, so that the operation of slaking becomes practically a continuous one.

Lime is slaked by the addition of water, which has long been done in a variety of ways. Where an insufficient initial addition of water is made to lime, some portion of the lime may be overheated before slaking or "burned," in which case it afterward can be slaked only very slowly, slaking often occurring long after the lime has been put into use, to the damage of the work desired, or where too large an amount of water is added to the lime the result is a pasty mass, which soon "sets," or in which some portions are dried by the heat of slaking, so as to form hard lumps. It is the further object of this invention to produce slaked lime in the form of dry powder, all portions of which are slaked lime.

By means of various processes, some of which are now patented, lime is already produced in the form of dry powder perfectly slaked; but in all of these processes a stationary plant for the work is contemplated, so that the operation is carried on chiefly in factories wholly designed for the business. It is the further object of my invention to enable consumers of lime and others to produce slaked lime in the form of dry powder upon their own premises.

Lime in an unslaked form unless barreled or suitably housed is when stored always a menace from fire, and it is the further object of this invention to enable consumers while unloading or handling the lime to their storehouses to completely hydrate or slake it, so that it will be safe and in such form that it will keep practically without deterioration.

With these objects in view my invention consists of certain novel features of construction and combinations and arrangements of parts, as will be more fully hereinafter described, and pointed out in the claims.

The accompanying drawing is a view in elevation illustrating one form of my invention.

1 represents an endless conveyer comprising an endless series of buckets or receptacles 2, which pass beneath and are closed (either each receptacle or several at a time) by a plate 3, as clearly shown. In advance of plate 3 and directly above the buckets or receptacles 2 is a water-supply 4, adapted to spray or spread the water supplied thereto by a pipe 5 into the receptacles as they pass beneath the same. This water-supply 4 consists of pipe or a box so slit or perforated on the under side as to deliver the water upon the entire contents of the receptacles 2. A chute 6 with automatic trip is provided in advance of water-supply 4 to discharge into each bucket or receptacle the proper amount of lime to be slaked in each, and as any approved form of trip or measuring device may be employed I do not restrict myself to any form of device for supplying the buckets or receptacles with lime in proper quantity. The receptacles 2 may be supplied conveniently with lime discharged from another conveyer (not shown in the drawing) working synchronously or otherwise.

As various forms of valves or openings may be employed to regulate the supply of water or it may be supplied to the receptacles by hand, I do not restrict myself to the supply shown as a box 4, and as a great variety of closures other than the plate 3 (shown in the drawing) may be employed for the receptacles or a box surrounding them to keep in the steam formed in slaking I do not restrict myself to plate 3.

The operation of my improvement is as follows: As the buckets or receptacles 2 pass chute 6 they receive each a definite quantity of lime and move beneath box 4, where they receive each the proper quantity of either cold or hot water, so spread or sprayed as to cover during the progress of each receptacle the entire surface of the lime in each, so that all the lime in each will properly slake with that amount of water. The buckets then pass beneath the closing-plate 3, and the lime is slaked in confinement. This plate is so extended and the duration of the passage is so regulated as to the progress of the buckets that they proceed consecutively until the lime in each is completely slaked, when the receptacles are overturned and their loads discharged into a proper receptacle or onto another conveyer (not shown as a part of this invention) or upon a sieve or otherwise for eventual delivery to any point of discharge.

Having fully described my invention, what I claim as new, and desire to secure by Letters Patent, is—

1. In a lime-slaking apparatus, a movable carrier, receptacles thereon for the reception of lime to be slaked during the progress of said receptacles, means for closing the receptacles during their progress to retain the steam formed in slaking and means for feeding lime and water into said receptacles, successively.

2. In a lime-slaking apparatus, a movable carrier, receptacles thereon for the reception of lime to be slaked during the progress of said receptacles, means for discharging water and lime into said receptacles as they progress and means for closing said receptacles during the slaking of the lime therein.

3. In a lime-slaking apparatus, the combination of an endless conveyer, comprising an endless series of buckets or receptacles, in which lime is slaked, a chute with trip or measuring devices for supplying the receptacles with definite amounts of lime each, a box or pipes for supplying proper amount of water during the progress of the receptacles, the water evenly distributed, and a plate, box, or covers, for retaining the steam formed in slaking during the progress of the receptacles by the movement of the conveyer, and the regulation of the length and speed of the conveyer so as to insure complete slaking during its operation.

In testimony whereof I have signed this specification in the presence of two subscribing witnesses.

JOHN P. RICH.

Witnesses:
GEORGE N. LEWIS,
HARLEY A. CLARK.